(12) United States Patent
Schulz

(10) Patent No.: US 7,556,220 B2
(45) Date of Patent: Jul. 7, 2009

(54) SEAL FOR SEALING A COMPONENT OPENING IN A COMPONENT

(75) Inventor: Alexander Schulz, Hollern (DE)

(73) Assignee: Airbus Deutschland GmbH (DE)

( * ) Notice: Subject to any disclaimer, the term of this patent is extended or adjusted under 35 U.S.C. 154(b) by 384 days.

(21) Appl. No.: 11/175,598

(22) Filed: Jul. 6, 2005

(65) Prior Publication Data

US 2006/0186606 A1 Aug. 24, 2006

(30) Foreign Application Priority Data

Jul. 6, 2004 (DE) .................. 10 2004 032 554

(51) Int. Cl.
*B64C 1/14* (2006.01)
(52) U.S. Cl. .................. 244/129.4; 277/644; 277/637; 244/119
(58) Field of Classification Search ............. 244/129.4, 244/119, 129.1, 130, 132, 133; 52/208; 220/243, 220/241, 242; 277/644, 654, 637, 549
See application file for complete search history.

(56) References Cited

U.S. PATENT DOCUMENTS

| | | | | | |
|---|---|---|---|---|---|
| 2,140,672 | A | * | 12/1938 | Gray et al. ............. | 156/92 |
| 4,067,155 | A | * | 1/1978 | Ruff et al. ............. | 52/105 |
| 4,171,785 | A | * | 10/1979 | Isenberg ............... | 244/123.1 |
| 4,296,899 | A | * | 10/1981 | Isenberg ............... | 244/207 |
| 5,014,934 | A | * | 5/1991 | McClaflin ............. | 244/132 |
| 5,106,037 | A | * | 4/1992 | Sherrill ............... | 244/132 |
| 5,314,144 | A | * | 5/1994 | Porter et al. ........... | 244/132 |
| 6,160,218 | A | * | 12/2000 | Azdasht et al. ......... | 174/549 |
| 6,915,987 | B2 | * | 7/2005 | Fisher et al. ........... | 244/129.3 |
| 2003/0110718 | A1 | * | 6/2003 | Boisvert ............... | 52/208 |

FOREIGN PATENT DOCUMENTS

| | | |
|---|---|---|
| EP | 0379189 | 7/1990 |
| GB | 129554 | 7/1919 |
| GB | 496505 | 6/1938 |
| GB | 532988 | 2/1941 |
| GB | 542051 | 12/1941 |

\* cited by examiner

*Primary Examiner*—Michael Carone
*Assistant Examiner*—Benjamin P Lee
(74) *Attorney, Agent, or Firm*—Lerner, David, Littenberg, Krumholz & Mentlik, LLP

(57) ABSTRACT

A seal for sealing component openings in components of a means of transport, in particular for sealing openings in aircraft airfoils and tail units, comprising an inner cover connected to an outer cover via connecting members. An insert may be arranged in the component opening the outer cover being at least locally adjacent to an insert outer surface, and the inner cover being at least locally adjacent to an insert inner surface. Due to the insert arranged in the component opening, manufacturing of the seal, e.g., by an injection molding technique, may be possible, producing already at manufacturing level a high surface quality of the resulting sealing surfaces between the insert, the inner cover, as well as the outer cover.

10 Claims, 2 Drawing Sheets

Section A-A

Section A-A

Section A-A

SEAL FOR SEALING A COMPONENT OPENING IN A COMPONENT

BACKGROUND OF THE INVENTION

This invention relates to a seal for sealing an opening in a component of a means of transport, in particular for sealing an opening in an aircraft airfoil, wing or tail units.

Seals for component openings in components, in particular manhole covers and other inspection ports, are known from the state of the art in many variants. Such component openings frequently have circular or elliptical cross-sectional geometries with large cross-sectional areas. There through, e.g., an inspection of the component can be performed from the inside, either manually or by a person crawling inside with the whole body (manhole).

Known openings comprise amongst other things an inner cover and an outer cover for spanning the component opening. To seal the component opening, the inner cover is placed on the component opening from the inside of the component, whereas the outer cover is placed on the component opening from the outside of the component. In order to obtain a fixed seating of the thus formed seal over the component opening, the outer cover and the inner cover are tightly pulled together by means of appropriate connecting members, e.g., in the shape of screw or clamp connections or the like. In addition, on the top side or underside of the component, at the component opening, peripheral recesses or cutouts can be incorporated for centering the outer cover or the inner cover inside the component and thus making sealing of the component opening easier as well as improving the sealing effect and ensuring high quality of the aerodynamic surface.

In order to obturate the component opening completely, e.g., for seals for tank systems, airfoil tanks or the like, it is frequently required to arrange additional sealing means between the outer cover and the inner cover and the component top side or component underside. This compensates for possible unevenness in the surface of the component or the sealing covers which would otherwise impair effective sealing of the component opening by the seal. In general, the sealing means can be omitted only if both the surface of the component and the surfaces of the outer cover or the inner cover matching therewith have high surface quality and are thus substantially free of unevenness. Such high surface quality can be obtained, e.g., by grinding or polishing of the corresponding sealing surfaces at the component opening or the sealing covers.

However, producing such sealing components of such high surface quality that additional sealing means are substantially unnecessary requires considerably increased manufacturing expenditure.

SUMMARY OF THE INVENTION

Amongst other things, it may be an object of the invention to reduce the manufacturing expenditure in comparison with conventional seals as the peripheral recess can be manufactured in a separate processing step. Processing of the component is thereby simplified, and even without additional surface treatment, e.g., grooves with inserted sealing rings are sufficient as sealing means. In general, flat sealings are no longer required.

According to an exemplary embodiment of the present invention, a seal for sealing a component opening in a component of a means of transport, in particular for sealing an opening in an aircraft airfoil, wing or aircraft tail unit is provided, wherein the seal comprises an inner cover, an outer cover, a plurality of connecting members, and an insert having an inner surface and an outer surface. The plurality of connecting members connect the inner cover to the outer cover. The insert is arrangeable in the component opening. The outer cover abuts against at least a first region of the outer surface of the insert and the inner cover abuts against at least a second region of the inner surface of the insert.

This may allow to reduce the manufacturing expenditure in comparison with conventional seals as the peripheral recess can be manufactured in a separate processing step. Processing of the component may thereby be simplified, and even without additional surface treatment, e.g., grooves with inserted sealing rings may be sufficient as sealing means. In certain circumstances, flat sealings are no longer required.

An insert being arrangeable in the component opening, with the outer cover being adjacent at least locally to an insert outer surface and the inner cover being adjacent at least locally to an insert inner surface, may allow for a manufacturing, e.g., by an injection molding technique producing a high surface quality of the resulting sealing surfaces which may make additional processing steps for improving the surface quality of the sealing surfaces unnecessary.

In addition, by using the seal according to an exemplary embodiment, the wall thickness at the component opening may be selected independently from the remaining material thickness of the component, so that reinforcements for low material thickness of the component at the component openings can possibly be omitted. This can result in material saving and thus weight reduction. If required, the insert and the component can be made of different materials.

Another exemplary embodiment of the invention provides that a peripheral outer cutout is incorporated into the insert, the outer cutout having a connecting surface. This may allow for easy and fast positioning of the insert at the assembly in the component opening.

According to another exemplary embodiment, in a region of a connecting surface, the closure or seal is at least regionally attached to a inner surface of the component, in particular by means of an adhesive layer. On the one hand, this structural design may allow easy fastening of the insert in the component opening or component. On the other hand, by means of the adhesive layer, unevenness due to the manufacturing technique in the surface of the component and/or the insert may be compensated for without impairing the tightness of the seal. Depending on the circumstances, additional surface treatment can be omitted.

In accordance with another exemplary embodiment, the outer cutout has a height approximately corresponding to a material thickness of the component in order to obtain a flush alignment of the outer cover with a outer surface of the component. Therewith, a fluidically convenient design of the component outer surface may be obtained.

According to another exemplary embodiment, the insert may be disc-shaped. This may ensure an easy manufacturability of the insert by means of known production processes.

DETAILED DESCRIPTION

Figure 1:
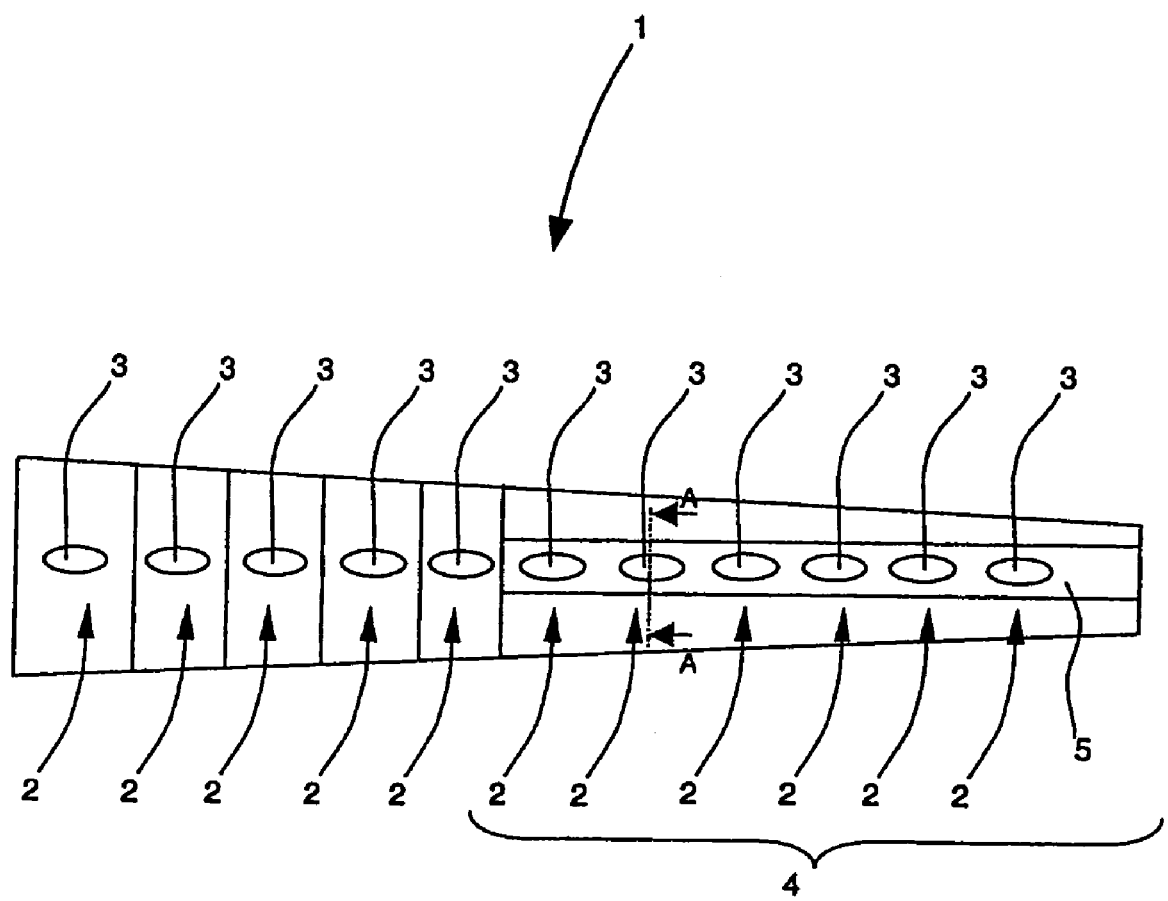
FIG. 1 shows a wing hull with a plurality of component openings with closures as well as a reinforcement.

FIG. 1 shows a wing hull 1 in a schematic bottom view with a plurality of component openings 2 fitted with seals 3. The seals 3 are for closing the component openings 2 in the wing hull 1. The component openings 2 can, e.g., be intended as inspection ports, manholes and the like for aircraft wing tanks being formed inside the wing hull 1. In an exterior area 4 of the wing hull 1, a reinforcement 5 is mounted in addition thereto. The reinforcement 5 allows the seal 3 to be integrated in areas of the wing hull 1 that only have low material thickness.

Figure 2:
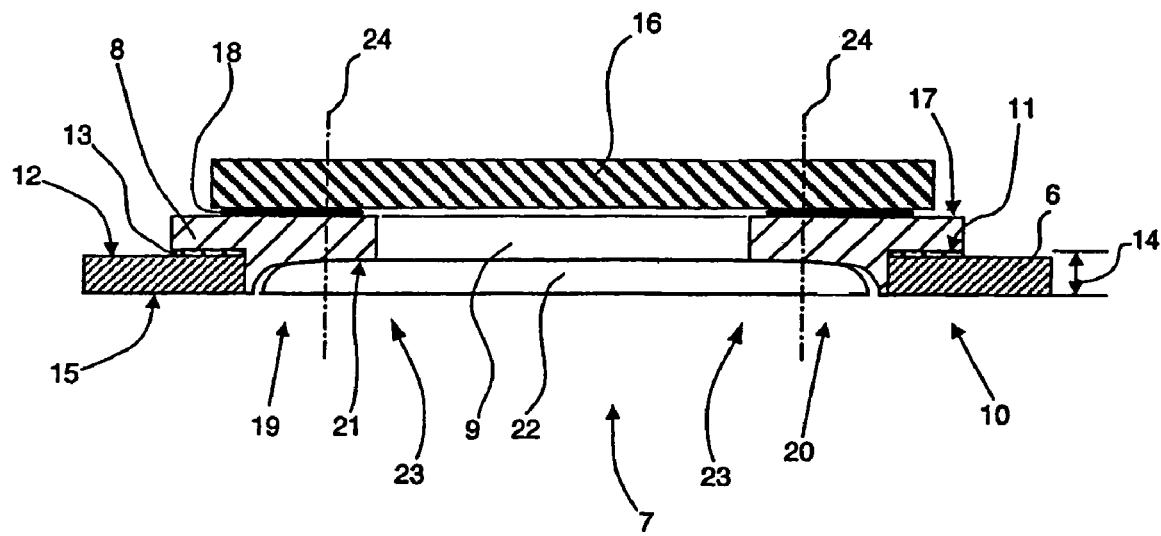
FIG. 2 shows an illustration of a section through a first exemplary embodiment of the seal according to the present invention along a section line A-A.

FIG. 2 shows an illustration of a section through a first exemplary embodiment of the seal according to the invention along section line A-A.

A component 6 has a component opening 7. Component 6 can be, e.g., an aircraft airfoil, wing, airfoil hull, horizontal tail, rudder unit, airfoil tank, horizontal tail and/or rudder unit tank, fresh water tank, waste water tank or the like. Component opening 7 can herein have a circular, elliptical or oval cross-sectional geometry. Other cross-sectional geometries are conceivable. In the exemplary embodiment shown in FIG. 2, component opening 7 has an elliptical cross-sectional geometry (see FIG. 1). Herein, the clearance of component opening 7 is to be adapted to the intended purpose thereof, e.g., as a manhole, manual inspection port or the like.

In component opening 7, an insert 8 with an insert opening 9 is arranged. Insert 8 has a peripheral external cutout 10 forming a first locating surface 11. Herein, insert 8 has an outer outline following approximately the inner outline of component opening 7. Together with the first locating surface 11, insert 8 rests on a component inner surface 12. Between the first locating surface 11 of the insert 8 and the component inner surface 12, an adhesive layer 13 is arranged by means of which insert 8 is solidly connected to component 6. Adhesive layer 13 also may serve the purpose of compensating minor unevenness on component inner surface 12 so that complete tightness of the seal in this area may be ensured. In addition to adhesive layer 13, other connecting members, such as rivets, screws or the like, can be provided to increase the strength of the connection between insert 8 and component 6. Instead of adhesive layer 13, it is also possible to provide, e.g., a flat sealing, with insert 8 then being connected to component 6 through connecting members, such as rivets or the like.

The outer cutout 10 has a height 14 corresponding approximately to the material thickness of component 6 plus the thickness of adhesive layer 13. Thereby, flush and thus fluidically convenient alignment of insert 8 with a component outer surface 15 may be obtained. This fact may be advantageous if the seal according to the invention is to be implemented, e.g., for sealing airfoil tanks in aircraft. Moreover, the outer cutout 10 also helps in centering insert 8 in component opening 7 during assembly thereof.

For closing or sealing the component opening 7, an inner cover 16 rests on insert 8. Between an insert inner surface 17 and inner cover 16, a sealing element or gasket 18 can be arranged. Gasket 18 may be omitted if the surface quality of the insert inner surface 17 and the corresponding surface of the inner cover 16 is so high that virtually no unevenness is left that could result in leakage. For forming gasket 18, e.g., a peripheral groove can be incorporated in insert 8, into which groove a correspondingly formed gasket can be inserted. As a gasket, e.g., an O-ring or the like can be used. Alternatively, it is also possible to use flat sealings.

In addition, insert 8 has an insert outer surface 19 into which a peripheral inner cutout 20 is incorporated to form a second locating surface 21. At the second locating surface 21, an outer cover 22 is adjacent thereto with an outer cover edge area 23. Herein, the surface geometry of the inner cutout 20 is arranged or configured such that the outer cover edge area 23 is almost interlockingly (form lockingly or form fittingly) adjacent to the second locating surface 21. This structural configuration in connection with a corresponding material thickness for outer cover 22 may allow to obtain an at least locally flush alignment of the outer cover 22 with the component outer surface 15 so that it results in a fluidically convenient integration of the seal in the component outer surface 15. In this respect, it has to be considered that due to necessary tolerances, it is may not be possible to obtain complete flushness among components.

In accordance with FIG. 2, outer cover 22 is connected to inner cover 16 via connecting members 24. As connecting members 24, e.g., screw connections, rivets, lever connections, clamp connections, or the like, can be envisaged. In addition, it is not required that the connecting members 24 be guided through insert 8. Connecting members 24 can e.g., also be arranged such that they go through insert opening 9 to connect outer cover 22 with inner cover 16. In an alternative embodiment, outer cover 22 can, e.g., also have an external thread engaging a corresponding internal thread in component opening 7 for screw fixing of outer cover 22.

It is believed to be advantageous that insert 8, inner cover 16 as well as outer cover 22 can be manufactured by a simple manufacturing technique, e.g., by injection mold process, with high surface quality. Expensive finishing steps—e.g., by grinding, polishing, or lapping—for manufacturing a surface quality at component opening 7, that is sufficient for the required sealing effect of the seal, may be omitted which may result in considerable time and cost savings in comparison with known solutions for such seals.

Gasket 18 between inner cover 16 and insert inner surface 17 is optional. Gasket 18 may only be required if the surface quality of the corresponding surfaces of inner cover 16 and insert inner surface 17 is not sufficient for obtaining the desired sealing effect of the seal.

Moreover, it is possible to provide between the second locating surface 21 of insert 8 and an edge area of a top side of outer cover 22 at least locally sealing means that are not shown in detail in FIG. 2, whereby the sealing effect of the seal can be improved. As sealing means, e.g., flat sealings, rivets with inserted gaskets, resilient sealing means, such as silicone, acrylic or the like, can be envisaged.

For reasons of weight saving, it is further possible to omit inner cover 16, and to connect outer cover 22 only by means of connecting members 24 to insert 8, in as far as this is allowed by strength requirements.

Figure 3:
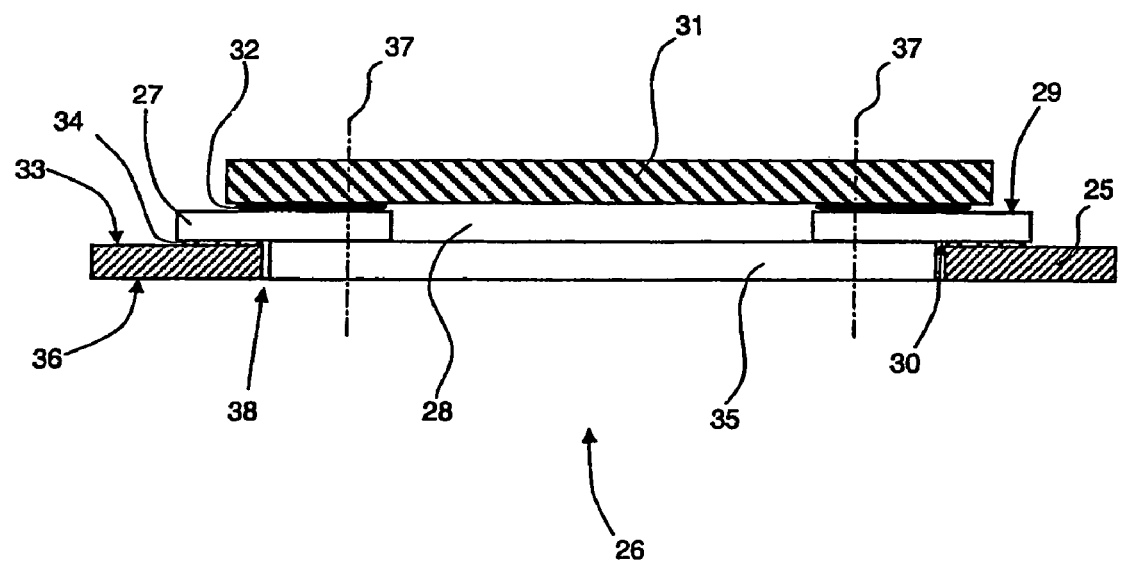
FIG. 3 shows an illustration of a section through a second exemplary embodiment of the seal according to the invention along section line A-A.

FIG. 3 shows an illustration of a section through another exemplary embodiment of the seal according to the invention along a section line A-A.

A component 25 has a component opening 26. The clearance of component opening 26 has to be sized according to the intended purpose of the seal, e.g., as a manhole cover, as a manual inspection port or the like.

In this embodiment of the seal according to an exemplary embodiment of the invention, an insert 27 is formed as a disc-shaped ring. Insert 27 in turn has an insert opening 28. In addition, insert 27 has an insert inner surface 29 and an insert outer surface 30. Herein, insert inner surface 29 and insert outer surface 30 extend approximately with parallel faces to each other because of the disc-shaped configuration of insert 27. An inner cover 31 rests on the insert inner surface 29. A gasket 32 is incorporated between insert inner surface 29 and inner cover 31. The gasket 32 can be formed, e.g., as a flat sealing. Alternatively thereto, the gasket 32 can be formed by a small groove into which, e.g., a sealing ring or the like is incorporated. If requirements for the sealing effect of the seal are not high, gasket 32 can be omitted. In this case, with a high surface quality of the insert inner surface 29 and a top side of the inner cover 31 it is still possible to obtain a sufficient sealing effect of the seal.

In an outer partial area, insert outer surface 30 rests on a component inner surface 33 and is, e.g., solidly connected thereto, e.g., by means of an adhesive layer 34. The adhesive layer 34 also helps to compensate minor unevenness on component inner surface 33 and/or insert outer surface 30. In addition to adhesive layer 34, other connecting members, such as rivets and the like, for increased strength of the connection between component 25 and insert 27 can be incorporated in the connection area. Instead of adhesive layer 34, e.g., a flat sealing can be provided, with insert 27 being connected via connecting elements, e.g., by rivets or the like, to component 25.

In contrast to the embodiment of the seal in accordance with FIG. 2, both the insert 27 and an outer cover 35 are disc-shaped with approximately plane-parallel surfaces. A top side of the outer cover 35 is preferably flush with a component outer surface 36 so as to integrate the seal or an outer surface of the outer cover 35 in a fluidically advantageous manner into component outer surface 36. For this purpose, outer cover 35 has at least in the edge area approximately a material thickness corresponding to the sum of the wall thickness of component 25 at the seal plus the height or thickness of adhesive layer 34.

Via connecting members 37, inner cover 31, insert 27 as well as outer cover 35 are solidly connected to each other and thus to component 25. Connecting members 37 can be formed, e.g., as screw or clamp connections or the like. Alternatively, it can be envisaged to provide an outer thread in outer cover 35 and an inner thread corresponding thereto in the component opening 26 so as to secure outer cover 35 in insert 27. In this case, inner cover 31 might be omitted.

Furthermore, it is also possible to provide between outer cover 35 and insert outer surface 30 sealing means, not shown in detail in the illustration of FIG. 3, such as flat sealings, sealing rings in grooves, resilient sealing means, such as silicone and acrylic or the like, so as to further improve the sealing effect of the seal.

Due to the disc-shaped geometrical configuration of insert 27, the latter is particularly easy to manufacture. Also in this embodiment, it might be possible to omit inner cover 31 completely and connect only outer cover 35 by means of insert 27 to component 25.

Due to the disc-shaped geometrical configuration of outer cover 35, in comparison with the embodiment in accordance with FIG. 2, a slightly larger gap dimension 38 may result between an outer edge of outer cover 35 and an inner wall of component opening 26. An outer cover with an inclined edge surface, e.g., in the shape of a cone, will reduce the gap dimension resulting between outer cover and component, with respect to a cylindrical outer cover.

The design of the seal according to an exemplary embodiment of the invention in accordance with FIG. 3 may ensure due to the substantially disc-shaped configuration of inner cover 31, outer cover 35 and insert 27, simplified manufacturability of the seal. In addition, insert 27, inner cover 31, as well as outer cover 35 can be manufactured, e.g., by an injection molding technique so that these components are from the start provided with high surface quality, even without expensive mechanical finishing of the corresponding surfaces—e.g., by grinding, polishing, lapping or the like—so as to result in a proper sealing effect of the seal. In addition, a standardization of said components is possible. Finally, if required, said components can also be made from other materials than component 25.

Furthermore, the disc-shaped configuration of inner cover 31, outer cover 35 and insert 27 allows for an efficient sealing effect of the seal according to an exemplary embodiment of the invention.

In an what is believed to be advantageous manner, the seal according to an exemplary embodiment of the invention is implemented for sealing manholes or the like in tanks and other inspection ports on airfoils and tail units made of composite fiber materials in aircraft.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

REFERENCE LIST 1 wing hull
2 component opening
3 seal
4 outer area
5 reinforcement
6 component
7 component opening
8 insert
9 insert opening
10 outer cutout
11 first locating surface
12 component inner surface
13 adhesive layer
14 height
15 component outer surface
16 inner cover
17 insert inner surface
18 gasket
19 insert outer surface
20 inner cutout
21 second locating surface
22 outer cover
23 outer cover edge area
24 connecting member
25 component
26 component opening
27 insert
28 insert opening
29 insert inner surface
30 insert outer surface
31 inner cover
32 gasket
33 component inner surface
34 adhesive layer
35 outer cover
36 component outer surface
37 connecting element
38 gap dimension

The invention claimed is:

1. A sealed structure of an aircraft airfoil, wing, or aircraft tail unit, the sealed structure comprising a component opening and a seal, the seal comprising:
   an inner cover;
   an outer cover;
   a plurality of connecting members;
   an insert having an inner surface and an outer surface;

wherein the plurality of connecting members connect the inner cover to the outer cover;
wherein the insert is arrangeable in the component opening;
wherein the outer cover abuts against at least a first region of the outer surface of the insert;
wherein the outer cover is flush with the outer surface of the component to obtain a fluidically advantageous configuration of the outer surfaces of the component; and,
wherein the inner cover abuts against at least a second region of the inner surface of the insert;
the sealed structure further comprising
a peripheral inner cutout;
a second locating surface;
wherein the outer cover is provided with an outer cover edge area;
wherein the peripheral inner cutout is provided in the insert;
wherein the peripheral inner cutout includes the second locating surface;
wherein the outer cover edge area is interlockingly insertable in at least a portion of the peripheral inner cutout.

2. The sealed structure of claim 1, further comprising:
at least one insert opening;
wherein the at least one insert opening is provided in the insert.

3. The sealed structure of claim 1, further comprising:
a peripheral outer cutout;
a first locating surface;
wherein the peripheral outer cutout is provided in the insert; and
wherein the outer cutout includes the first locating surface.

4. The sealed structure of claim 3,
wherein, in at least a portion of a third region of the first locating surface, the insert is fixed to a inner surface of the component, in particular by means of an adhesive layer.

5. The sealed structure of claim 1,
wherein the insert is at least regionally flush with an outer surface of the component to obtain a fluidically convenient configuration of the outer surface of the component.

6. The structure of claim 1, further comprising:
a sealing element;
wherein the sealing element is arranged in at least a region between the inner cover and the insert inner surface.

7. The sealed structure of claim 1, wherein the insert is disc-shaped.

8. The sealed structure of claim 7,
wherein an outer surface of the insert is at least regionally attached to an inner surface of the component, in particular by means of an adhesive layer.

9. The sealed structure of claim 7, further comprising:
a sealing element;
wherein the sealing element is arranged in at least a region between the inner cover and the insert inner surface.

10. A seal for sealing a component opening in an aircraft foil, wing, or tail unit, the seal comprising:
an inner cover;
an outer cover;
a plurality of connecting members;
an insert having an inner surface and an outer surface;
a peripheral inner cutout;
a second locating surface;
wherein the plurality of connecting members connect the inner cover to the outer cover;
wherein the insert is arrangeable in the component opening;
wherein the outer cover abuts against at least a first region of the outer surface of the insert;
wherein the outer cover is at least regionally flush with the outer surface of the component, and
wherein the inner cover abuts against at least a second region of the inner surface of the insert;
wherein the outer cover is provided with an outer cover edge area;
wherein the peripheral inner cutout is provided in the insert;
wherein the peripheral inner cutout includes the second locating surface;
wherein the outer cover edge area is interlockingly insertable in at least a portion of the peripheral inner cutout.

* * * * *